United States Patent
Ailor, III et al.

(10) Patent No.: US 10,914,842 B2
(45) Date of Patent: Feb. 9, 2021

(54) DATA RECOVERY DEVICE FOR HYPERSONIC VEHICLES

(71) Applicant: The Aerospace Corporation, El Segundo, CA (US)

(72) Inventors: William H. Ailor, III, Palos Verdes Estates, CA (US); Jeffrey Arthur Lang, Torrance, CA (US); James Lawrence Hoffman, II, Manhattan Beach, CA (US); Jerome K. Fuller, Van Nuys, CA (US); Jeffry Padin, El Segundo, CA (US); Michael Alan Weaver, Redondo Beach, CA (US); Franklin John Bayuk, Cedar Rapids, IA (US)

(73) Assignee: The Aerospace Corporation, El Segundo, CA (US)

( * ) Notice: Subject to any disclaimer, the term of this patent is extended or adjusted under 35 U.S.C. 154(b) by 64 days.

(21) Appl. No.: 16/199,049

(22) Filed: Nov. 23, 2018

(65) Prior Publication Data

US 2020/0166651 A1    May 28, 2020

(51) Int. Cl.
| | | |
|---|---|---|
| G08B 1/08 | (2006.01) |
| G01S 19/03 | (2010.01) |
| B64D 1/02 | (2006.01) |
| B64D 45/00 | (2006.01) |
| B64F 5/60 | (2017.01) |
| G08G 5/00 | (2006.01) |
| H01Q 1/12 | (2006.01) |
| H01Q 1/28 | (2006.01) |
| H01Q 1/48 | (2006.01) |
| G01S 19/35 | (2010.01) |
| H04B 7/185 | (2006.01) |

(52) U.S. Cl.
CPC .............. *G01S 19/03* (2013.01); *B64D 1/02* (2013.01); *B64D 45/00* (2013.01); *B64F 5/60* (2017.01); *G01S 19/35* (2013.01); *G08G 5/0021* (2013.01); *H01Q 1/125* (2013.01); *H01Q 1/28* (2013.01); *H01Q 1/48* (2013.01); *H04B 7/18502* (2013.01)

(58) Field of Classification Search
None
See application file for complete search history.

(56) References Cited

U.S. PATENT DOCUMENTS

| | | | | |
|---|---|---|---|---|
| 4,639,229 A * | 1/1987 | Wright | .................... | B64D 1/02 206/223 |
| 5,612,130 A * | 3/1997 | Smirnov | ................ | C09K 21/02 428/323 |
| 5,969,674 A * | 10/1999 | von der Embse | .... | G01S 13/003 342/357.2 |
| 9,738,398 B1 * | 8/2017 | Wang | .................... | B64D 45/00 |
| 9,745,071 B1 * | 8/2017 | Wang | .................... | B64D 45/00 |

(Continued)

*Primary Examiner* — Julie B Lieu
(74) *Attorney, Agent, or Firm* — LeonardPatel PC

(57) ABSTRACT

A data recovery device configured to store data onboard a hypersonic vehicle travelling at hypersonic speeds. The data recovery device is released from the hypersonic vehicle upon a release command or an anomalous event. Upon release, the data recovery device is configured to receive Global Positioning System (GPS) position data and configured to broadcast the GPS position data in short bursts during decent to a surface of the Earth and upon impact with the surface of the Earth to aid in recovery of the data recovery device.

24 Claims, 8 Drawing Sheets

(56) References Cited

U.S. PATENT DOCUMENTS

| | | | |
|---|---|---|---|
| 9,975,640 B1* | 5/2018 | Wang | B64D 45/00 |
| 10,713,859 B1* | 7/2020 | McZeal, Jr. | B64D 1/12 |
| 2003/0032426 A1* | 2/2003 | Gilbert | H04W 84/02 |
| | | | 455/427 |
| 2008/0218401 A1* | 9/2008 | Loomis | G01S 19/09 |
| | | | 342/66 |
| 2016/0214716 A1* | 7/2016 | Knoblach | B64B 1/42 |
| 2017/0029128 A1* | 2/2017 | Ye | B64D 3/00 |
| 2017/0251096 A1* | 8/2017 | Koepke | H04M 1/72538 |
| 2018/0111686 A1* | 4/2018 | Nixon | B64D 1/02 |
| 2018/0346144 A1* | 12/2018 | Pogorelik | B61L 3/002 |
| 2019/0025436 A1* | 1/2019 | Murphy | B64D 45/0059 |

* cited by examiner

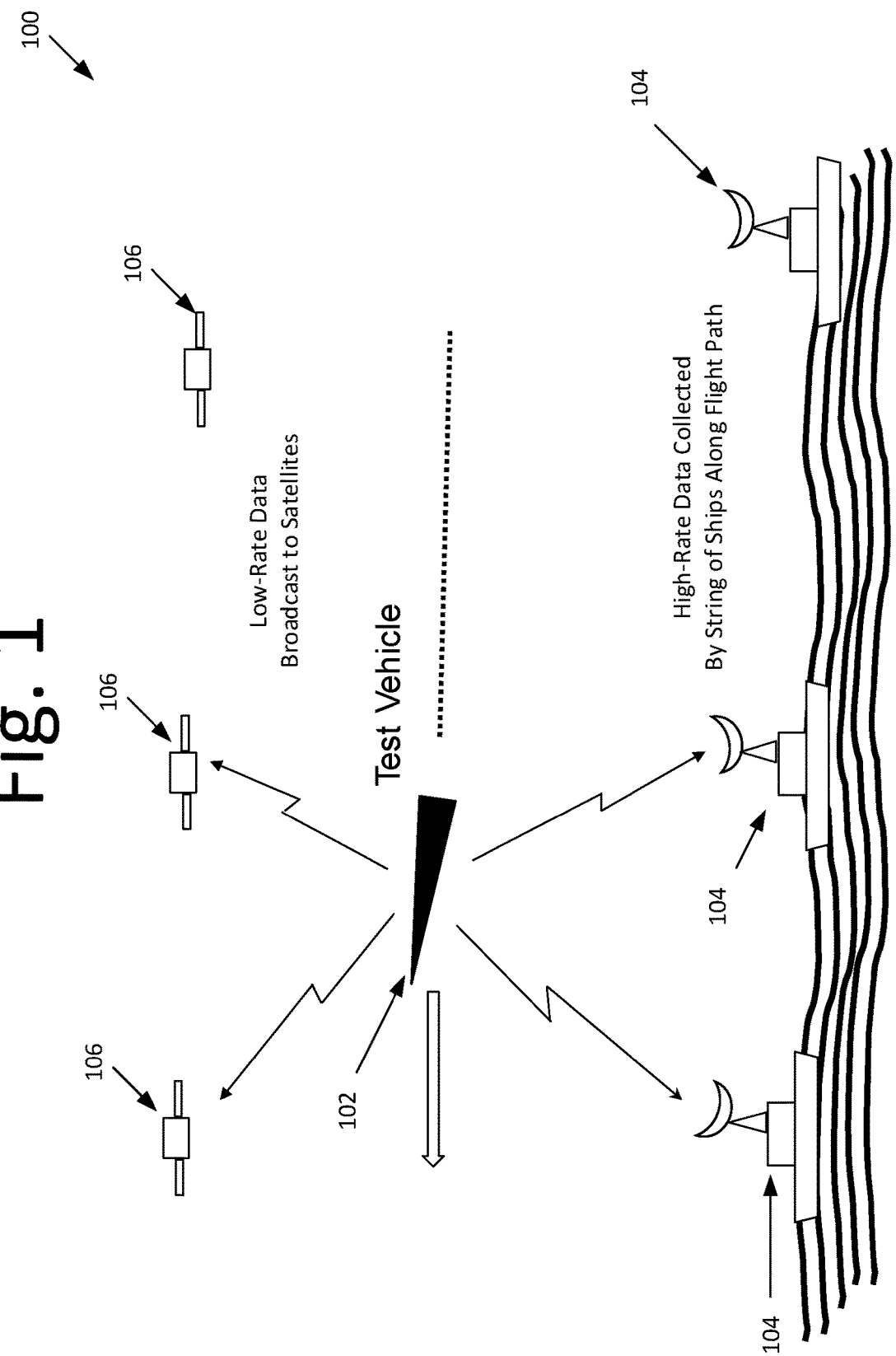

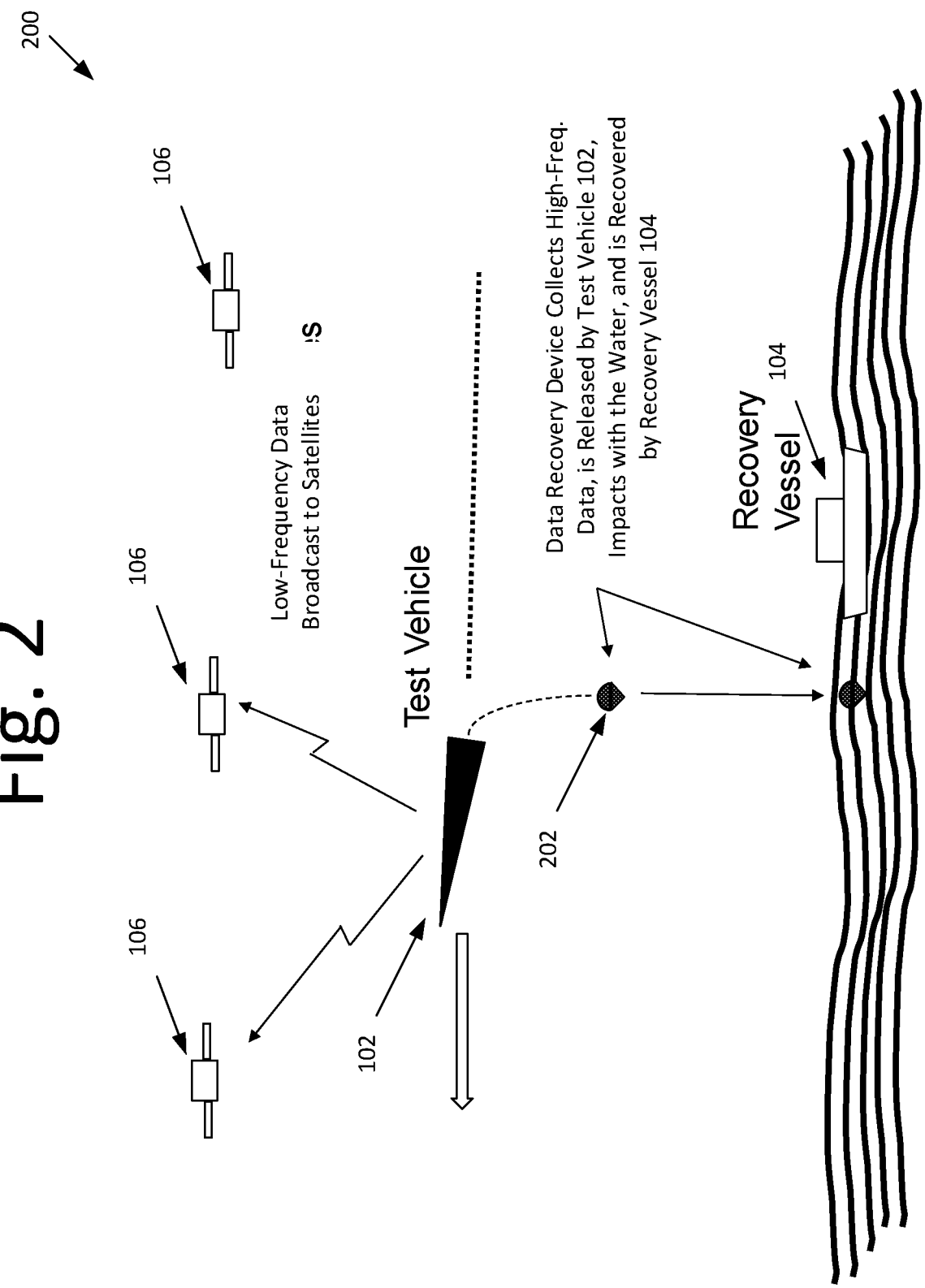

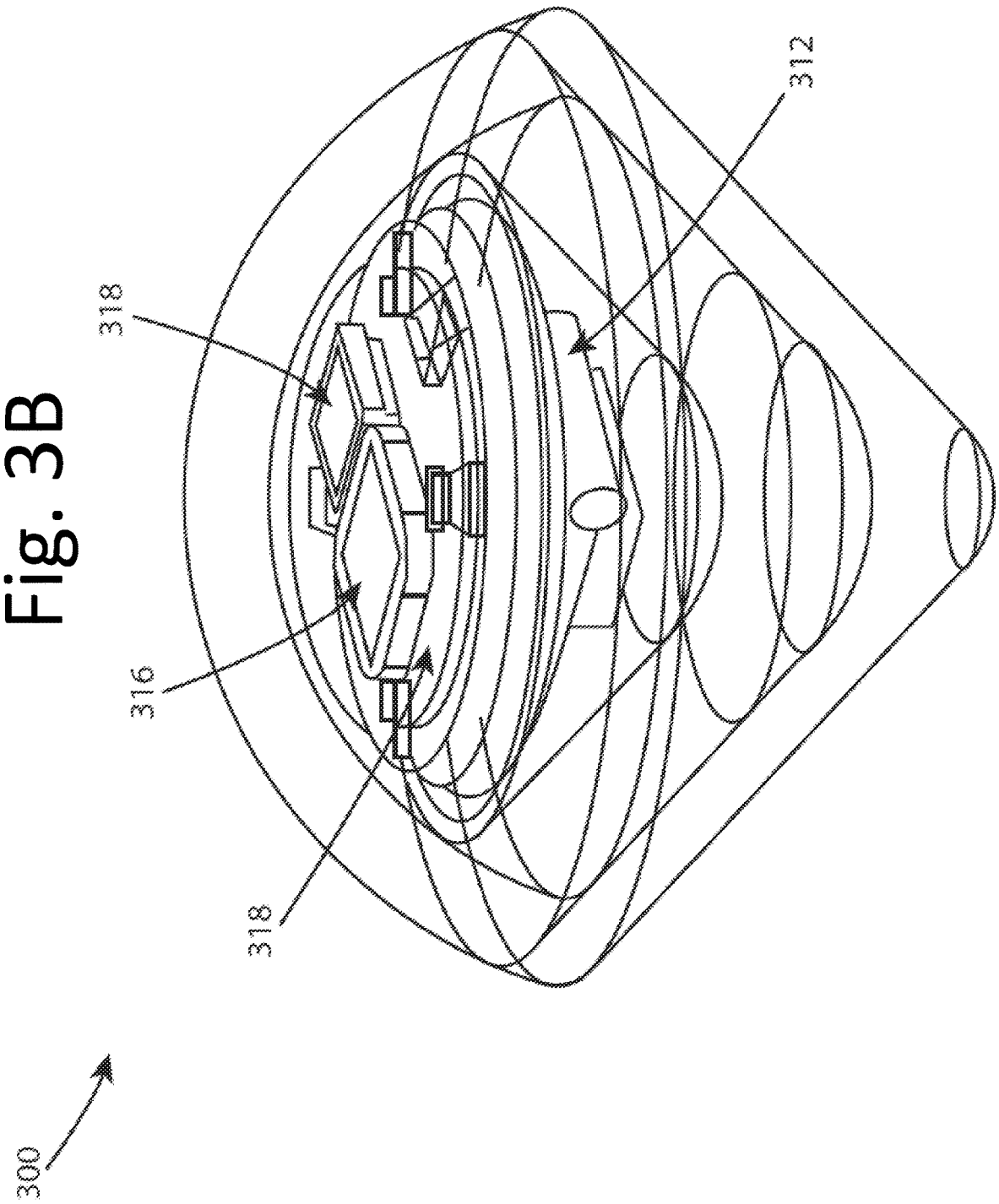

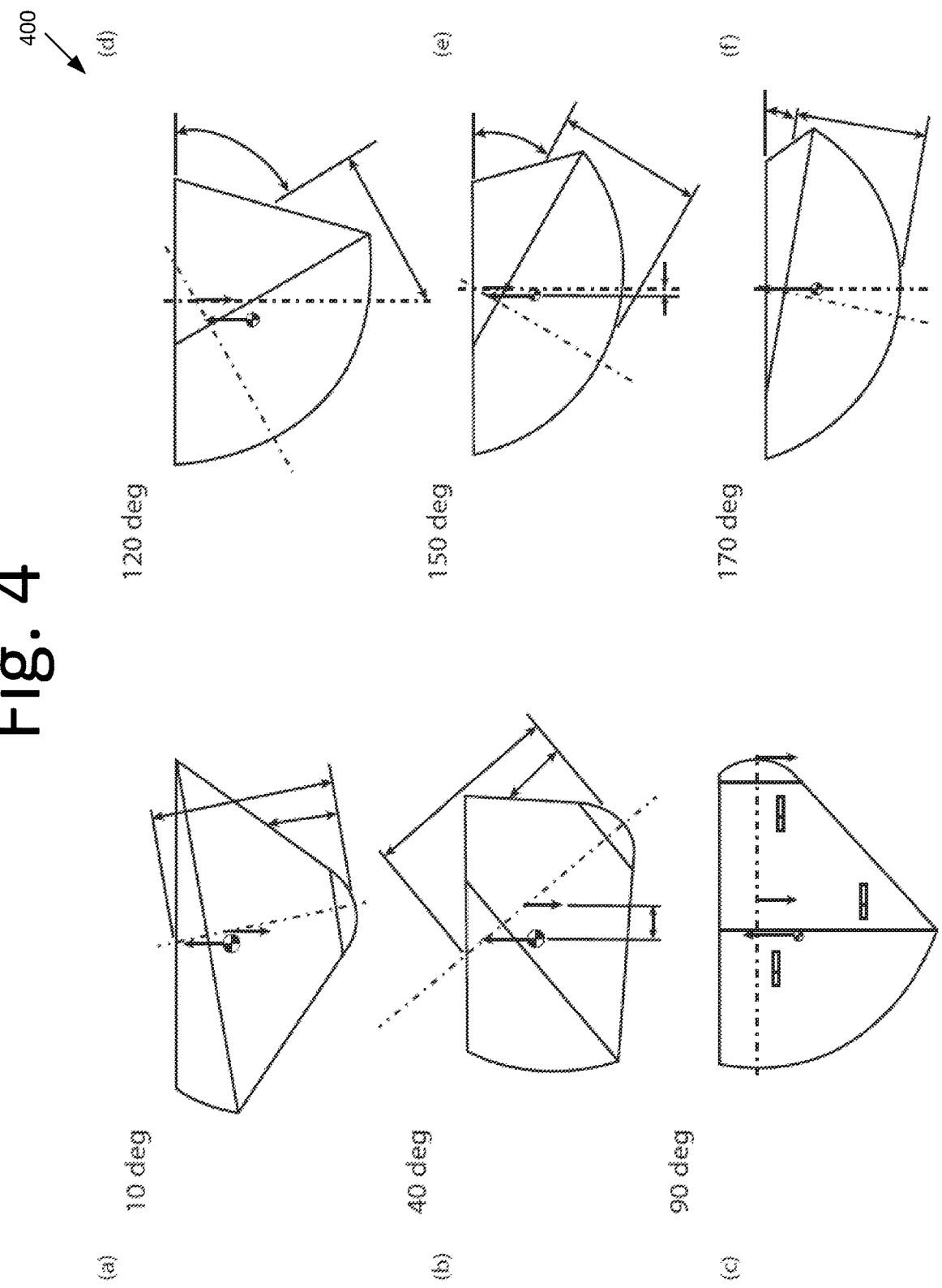

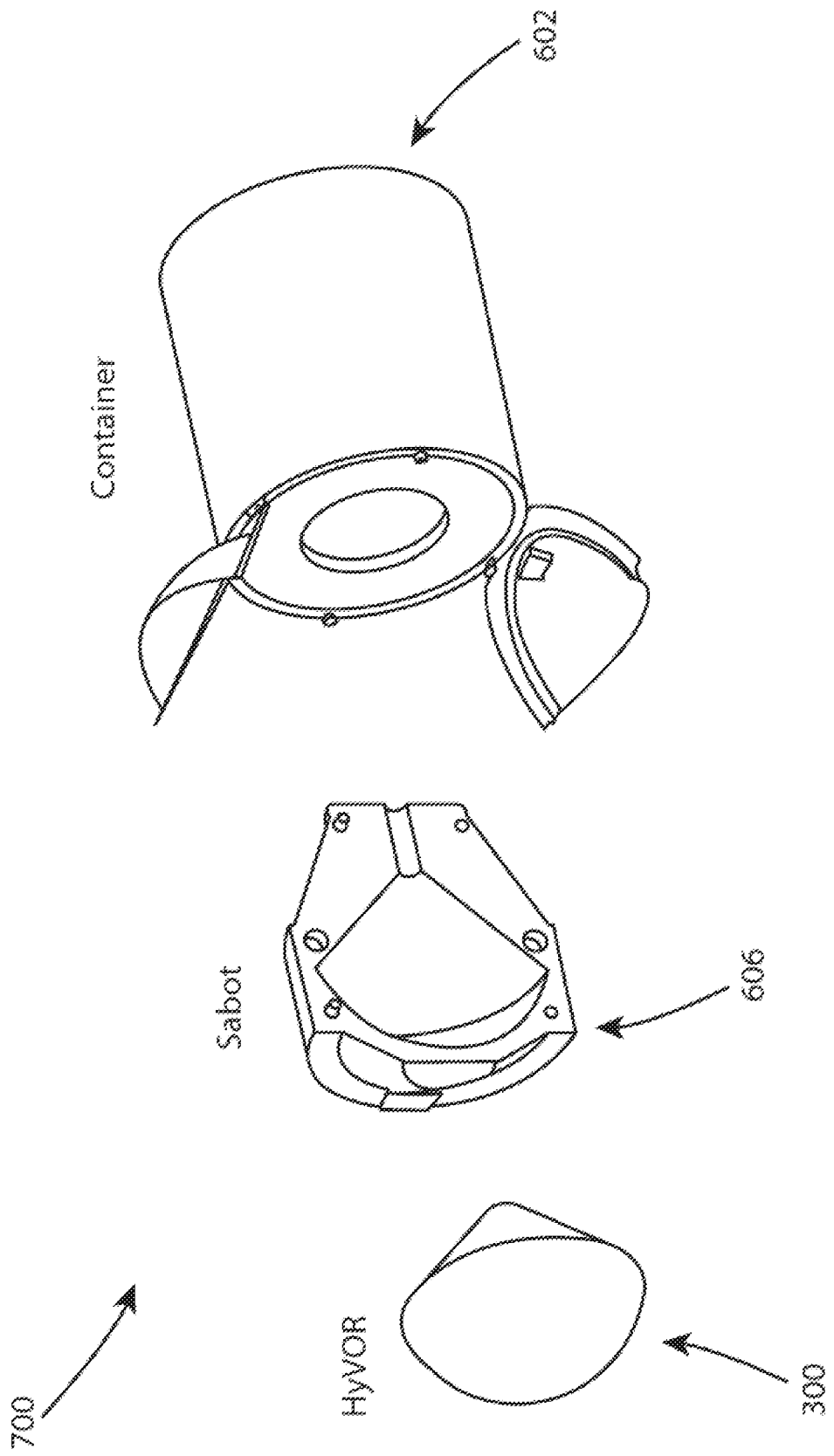

DATA RECOVERY DEVICE FOR HYPERSONIC VEHICLES

STATEMENT OF INTEREST

This invention was made with government support under contract No. FA8802-14-C-0001 awarded by the Department of the Air Force. The government has certain rights in the invention.

FIELD

The present invention relates to a data recovery device, and more particularly, to a data recovery device configured to store large quantities of data related to a hypersonic vehicle.

BACKGROUND

There are several organizations developing hypersonic vehicles. Before final production of the hypersonic vehicles, there are several test flights that are carried out. With test flights come failures. Thus, it is imperative to obtain high-rate telemetry during the test flights of the hypersonic vehicles.

There are several concepts that return telemetry data. However, these concepts do not return high-rate telemetry during a test flight of the hypersonic vehicle. For example, previous concepts utilize a technique called "String of Pearls." See, for example, FIG. 1. The "String of Pearls" technique utilizes a combination of aircraft, ground stations, and ships (collectively known as "assets") to capture telemetry data. As shown in FIG. 1, before the flight of a hypersonic vehicle 102, several assets 104 are placed down range in a string-like manner. During flight of hypersonic vehicle 102, telemetry data is captured by assets 104 and communicated with one or more satellites 106.

However, with this technique, the cost of utilizing assets (e.g., aircraft, ground stations, and ships) 104 is extremely high (e.g., ~$20 million/test). Also, some assets 104 are available for only a short period of time. This limited availability causes scheduling issues for the test flight.

Further, during a test flight, there is a high likelihood of failure, and therefore, it is imperative to get as much data as possible. Because the "String of Pearls" technique may not return a high-rate of telemetry for the hypersonic vehicle if there is a failure of a critical component onboard the hypersonic vehicle, limited or no data may be returned.

Currently, there are no known devices configured to return large quantities of data from vehicles flying at hypersonic speeds for subsequent recovery and analysis. Further, current devices require a substantial thermal protection system to protect the data recorder from the hypersonic environment and other harsh environments.

Thus, an alternative data recovery device configured to collect data, survive release into the hypersonic environment, survive impact, float in the ocean, transmit position data while riding low in the ocean environment and recoverable after both water and land impacts may be beneficial.

SUMMARY

Certain embodiments of the present invention may provide solutions to the problems and needs in the art that have not yet been fully identified, appreciated, or solved by current recording devices for hypersonic vehicles. For example, some embodiments generally pertain to a data recovery device configured to collect large amounts of data and survive release into the hypersonic environment. The data recovery device is configured to transmit position location (or Global Positioning System (GPS)) data while surviving impact with the ground or ocean. The data recovery device is further configured to transmit position data while riding low in an ocean environment and is recoverable after both water and ground impact.

In an embodiment, an apparatus includes a data recovery device configured to store data onboard a hypersonic vehicle travelling at hypersonic speeds. The data recovery device is released from the hypersonic vehicle upon a release command or an anomalous event, and upon release, the data recovery device is configured to receive GPS position data and configured to broadcast the GPS position data in short bursts during decent to a surface of the Earth and upon impact with the surface of the Earth to aid in recovery of the data recovery device.

In another embodiment, a data recovery system comprises a container within a hypersonic vehicle. The container may house a data recovery device during hypersonic flight, and may include an ejection mechanism configured to eject the data recovery device from the container upon a breakup event or a command for release. Upon ejection from the container, the data recovery device is configured to receive GPS position data and configured to broadcast the GPS position data in short bursts during decent to a surface of the Earth and upon impact with the surface of the Earth to aid in recovery of the data recovery device.

In yet another embodiment, a data recovery device may include a modem and an antenna ground plane. The modem includes GPS receiver and Iridium modem configured to receive GPS position data upon ejection from a hypersonic vehicle. The antenna ground plane includes an Iridium antenna and a GPS antenna configured to broadcast the GPS position data upon ejection from the hypersonic vehicle. The data recovery device also includes a ballast near the rear of data recovery device. The ballast is configured to cause the data recovery device to face towards zenith of the Earth's atmosphere upon impact with the Earth's surface.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a diagram illustrating a conventional data transmission system.

FIG. 2 is a system diagram illustrating a data recovery system configured to store large amounts of telemetry data related to hypersonic flights, according to an embodiment of the present invention.

FIGS. 3A and 3B are diagrams illustrating a data recovery device for the hypersonic vehicle, according to an embodiment of the present invention.

FIG. 4 are diagrams illustrating relative locations of a center of buoyance and gravity for the data recovery device, according to an embodiment of the present invention.

FIG. 7 is a flow diagram illustrating deployment of the data recovery device from the container, according to an embodiment of the present invention.

DETAILED DESCRIPTION OF THE EMBODIMENTS

Figure 3A:
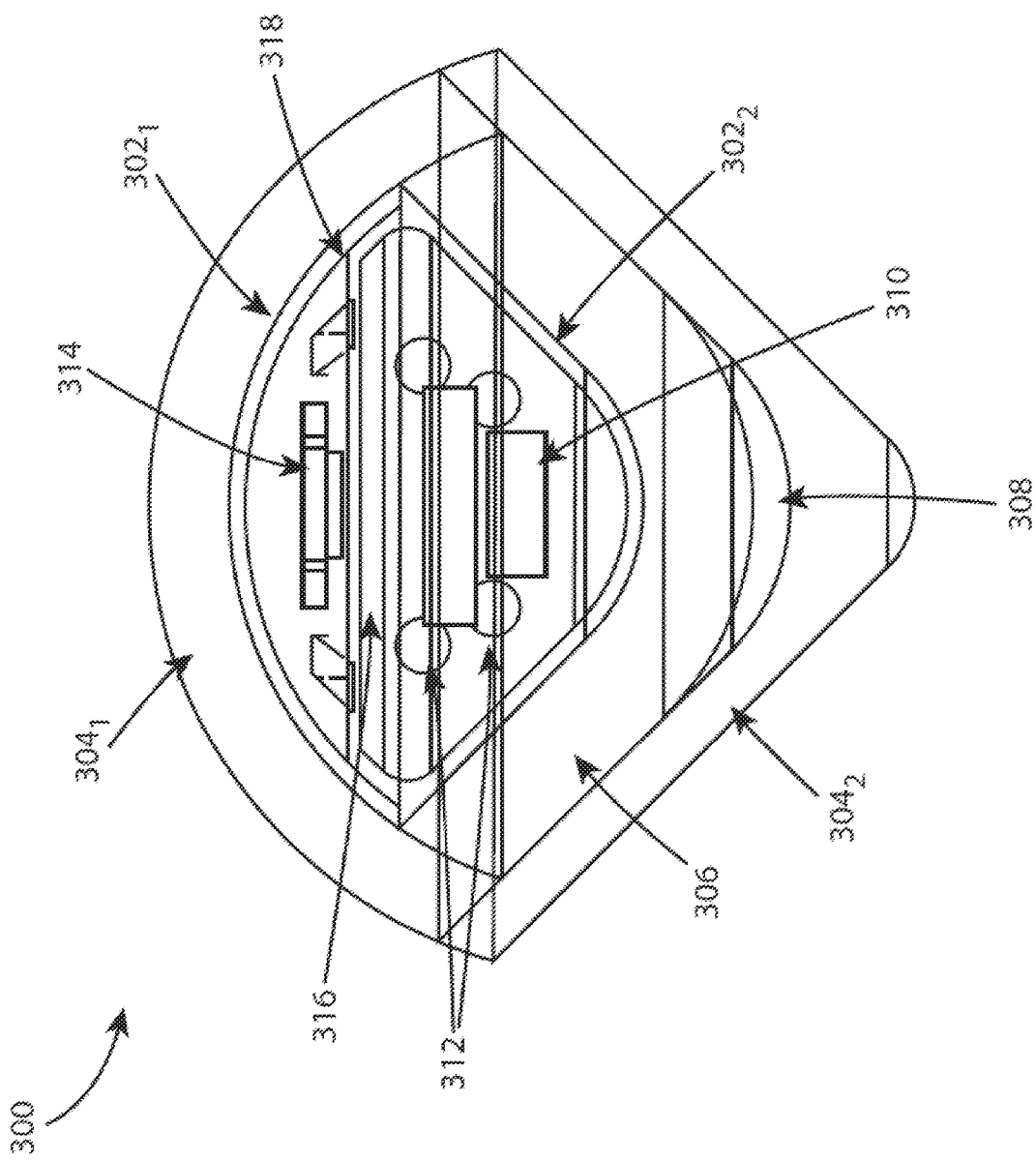

Some embodiments generally pertain to a data recovery device that provides a cost-effective means to record and return large quantities of data (e.g., 250 GB) from hypersonic (or test) vehicles travelling at hypersonic velocities. The data recovery device is a small, lightweight device housed in a protective container. In certain embodiments, the data recovery device is attached to and protected from flight environment by, the protective container and/or host vehicle.

The data recovery device includes a small, lightweight, rugged solid-state memory device configured to collect and store sensor information during flight. In some embodiments, ruggedized may be defined as being waterproof and configured to withstand accelerations of 100 g's in any direction. The data recovery device is released upon command from the hypersonic vehicle (or the "host vehicle") or by an anomalous event (e.g., in-flight break-up of the vehicle). After release, the aeroshell design/configuration of the data recovery device is configured to protect the solid state the memory device, as well as other components that are housed within a payload of the data recovery device.

During descent to the Earth, the data recovery device includes a GPS receiver, configured to receive position data, both during freefall and while floating in the ocean. In some embodiments, an Iridium and GPS antenna within the payload is configured to transmit or broadcast the position data during descent and after impact with the Earth surface (e.g., land or ocean). For example, the Iridium and GPS antenna is configured to broadcast short bursts of GPS position data to a recovery team.

The time interval between transmissions of position data for the recovery device may be controlled remotely in some embodiments. The GPS position data assists in the recovery of the data recovery device, both on land or in the ocean. Further, data recorded during flight of the host vehicle, such as telemetry data, must be retrieved after recovery.

The data recovery device is self-stabilizing, in some embodiments. Self-stabilizing may be defined as after release the device rights itself such that the Iridium antenna is pointed toward the zenith during flight, before ground or water impact, and while floating in the ocean. The data recovery device includes a thermal protection system (TPS) around the payload. The TPS is configured to survive the harsh aerothermodynamic environment associated with normal flight of the hypersonic vehicle, but also the even more extreme environments associated with failure of the hypersonic vehicle. The TPS may be composed of carbon-carbon-type or similar materials, with design tailored to the specific flight test mission. Materials and TPS design will be specified to minimize ablation and shape change, which are potentially detrimental to aerodynamic and buoyant stability requirements for the data recovery device. In some embodiments, the data recovery device also includes a TPS configured to prevent breakup during impact with the Earth's surface.

During flight, the data recovery device is placed within a container, which includes an ejection mechanism. Generally, the container is located in the aft section of the hypersonic vehicle and is ejected during an anomalous event or in response to a command. Further, during flight, the data recovery device draws power from the hypersonic (or host) vehicle rather than the power source of the data recovery device. Upon ejection of the data recovery device, the device's internal power source is activated to provide power for periodic transmission of position data.

Near or at the bottom of the data recovery device is a ballast. The ballast is configured to maintain the proper orientation of the Iridium and GPS antenna toward zenith when the data recovery device is falling after release from the host vehicle. The ballast is also configured to force the Iridium and GPS antenna to face toward the zenith while floating to transmit the GPS position data via the Iridium and GPS antenna to the recovery team.

In some embodiments, the data recovery device includes strobe lights configured to emit light to assist personnel in finding the onboard recorder when the onboard recorder is floating in the ocean. In some further or alternative embodiments, the data recovery device is coated with paint and/or marked with colored tape, configured to assist in recovery when floating in the ocean. In some other embodiments, the data recovery device is painted to aid in recovery.

FIG. 2 is a system diagram illustrating a data recovery system 200 configured to store large amounts of telemetry data related to hypersonic flights, according to an embodiment of the present invention. During flight, hypersonic vehicle 102 broadcasts data to satellites 106. Data recovery device 202 housed in its ejection container is attached to or within hypersonic vehicle 102 prior to flight. During flight, hypersonic vehicle 102 sends data to data recovery device 202. On command (or as a result of a breakup accident), data recovery device 202 with the stored data is released, is decelerated by interaction with the atmosphere, acquires the GPS signal and estimates its location, and sends the position data at predetermined interval(s). Data recovery device 202 impacts in the water or on land. If data recovery device 202 lands in the water, data recovery device 202 floats and continues to broadcast the GPS position data until retrieved by a recovery vessel 104. If data recovery device 202 lands on land, a recovery team is led to data recovery device 202 by the last broadcast position before impact. After recovery, the recorded data is retrieved from the solid-state memory device housed within data recovery device 202.

FIGS. 3A and 3B are diagrams illustrating a data recovery device 300 for the hypersonic vehicle, according to an embodiment of the present invention. In some embodiments, data recovery device 300 is a short burst data system configured to receive a periodic GPS position data and send the GPS position data periodically via a short-burst message after release from the hypersonic vehicle. Because it would be difficult to assure the resting position of data recovery device 300 after impact with the land, data recovery device 300 is configured to transmit GPS position data frequently during descent towards Earth. This way, if data recovery device 300 is destroyed upon impact with the land, data recovery device 300 may still be recovered in a timely manner based on the last position data broadcasted prior to impact.

In some embodiments, data recovery device 300 includes an aeroshell design, composed of a top aeroshell $302_1$ and bottom aeroshell $302_2$, to protect the payload within data recovery device 300. The aeroshell design may also provide support for the exterior TPS. See discussion below.

Exterior to aeroshells $302_1$, $302_2$ is a TPS. In developing the TPS, the heating environment to which data recovery device 300 would be exposed to was examined. For example, two key heating environments include 1) the maximum heating rate environment possible if data recovery device 300 is released somewhere along the flight of the hypersonic vehicle and 2) is the trajectory that provides the maximum total heating data recovery device 300 would experience. These values are determined by spanning the range of trajectories possible for the hypersonic vehicle, varying the release conditions of data recovery device 300 along these trajectories, and selecting the two flight profiles of data recovery device 300 that maximize each of these two parameters. Additional requirements may include that top TPS $304_1$ and top aeroshell $302_1$ covering the aft dome must be RF transparent. After meeting these limiting conditions, the TPS is designed to assure that the temperature internal to data recovery device 300 does not exceed a specified value set by temperature limits of the electronics and power system (e.g., 80° C.).

In some embodiments, the TPS is composed of a top TPS $304_1$ and a bottom TPS $304_2$. Top and bottom TPSs $304_1$, $304_2$ are configured to protect data recovery device 300 upon reentry into the Earth's atmosphere, as well as upon impact with the land or ocean. Between bottom Aeroshell $302_2$ and bottom TPS $304_2$ is insulation 306. Insulation 306 may provide additional insulation from the aerodynamic heating after release from the hypersonic vehicle.

To maintain proper stability during atmospheric flight after release from the hypersonic vehicle and assure an upright position upon impact with the ocean, a ballast 308 may be placed between insulation 306 and bottom TPS $304_2$, and more specifically, near the bottom of data recovery device 300. In some embodiments, ballast 308 is composed of tungsten and placed at the nose to position the overall center of gravity.

A more detailed explanation of ballast is described below with respect to FIG. 4.

The payload of data recovery device 300 includes a solid-state memory device 310 configured to store large amounts of data. The data may include telemetry data relating to the flight of the hypersonic vehicle and the functioning of hypersonic vehicle systems. These might include measurements of the temperatures experienced at locations throughout the hypersonic vehicle, functioning of flight control and propulsion systems, accelerations experienced by the hypersonic vehicle, hypersonic vehicle dynamics, vibrations, and other parameters that describe the general health of the hypersonic vehicle and its systems and the environment to which it is exposed. In some embodiments, this data is collected during flight.

Next to solid-state memory device 310 is a power source 312. Power source 312 is configured to supply power to data recovery device 300 upon release from the hypersonic vehicle. Before flight and while attached to the hypersonic vehicle, however, data recovery device 300 receives power from the hypersonic vehicle via USB or similar connection. For example, data recovery device 300 is powered by the hypersonic vehicle, and when the connection to the hypersonic vehicle is severed, power source 312 is activated assuring a smooth shutdown. In some embodiments, when the connection is severed, power source 312 provides limited supply of power to modem 314. In some embodiments, modem 314 includes a GPS receiver to receive GPS position data and an Iridium modem configured to broadcast the location of data recovery device 300 via short burst data messages. The Iridium modem may also be configured to receive external commands sent via the Iridium system. For example, external commands may include adjustments of the time interval between transmissions of location data and commands to activate strobe lights or other recovery aids. Antenna ground plane 318 includes Iridium antenna 316 and GPS antenna 317 configured to receive and broadcast the GPS position data. Solid-state memory device 310, in certain embodiments, hibernates until activated after recovery to reduce the amount of power consumed by data recovery device 300. This way, very little power is consumed by data recovery device 300.

In some embodiments, power source 312 may include a series of batteries, or at least one battery. Types of batteries used may include commercially available lithium AA or similar batteries, or batteries specifically designed for this application. It should be appreciated that the batteries are selected based on the power requirement for receiving and broadcasting the periodic updates of the data recovery device's location and other recovery aids, if included in the design.

As discussed above, during descent to Earth and even after impact with Earth's surface, modem 314 is configured to receive GPS position data via GPS antenna 317. This position data is then broadcasted in a Short Burst Data message to the data recovery team (not shown) by way of Iridium antenna 316. Although this embodiment utilizes an Iridium antenna, the embodiments are not limited to an Iridium antenna. In this embodiment, antenna 316 and antenna 317 are attached to antenna ground plane 318, which is a flat or nearly flat horizontal conducting surface that serves as part of an antenna and reflects the radio waves from the other antenna elements.

In addition to the periodic updates on GPS position data, data recovery device 300 may include two additional recovery aids—a radio frequency (RF) beacon and strobe lights. These additional recovery aids may be activated by commands sent via the Iridium system and received by the Iridium modem to help a recovery team once the recovery team has arrived in the general area of a floating data recovery device 300. In some additional embodiments, data recovery device 300 may include a plurality of high-output light emitting diode (LED) strobe lights around the periphery of its top dome to enhance visibility at night. These lights, when activated by a signal from the recovery team, may flash at a predefined interval. In some other embodiments, data recovery device 300 may broadcast a homing signal when the recovery team gets near.

Though not shown in FIG. 3, payload 310 includes control electronics configured to assure a smooth shutdown on solid-state memory device 310 when the link to the hypersonic vehicle is severed. The control electronics also commands periodic collection of the GPS data and broadcast of that data as a short-burst data message based on a predefined sequence after release from the hypersonic vehicle. The control electronics also is configured to receive and act upon messages sent via the Iridium system commanding changes in the frequency of broadcasts of position data or activation of recovery aids such as strobe lights or RF beacons, if included.

FIG. 4 are diagrams (a)-(f) illustrating relative locations of a center of buoyance and gravity for the data recovery device, according to an embodiment of the present invention. Proper functioning of the recovery requires the data recovery device to float with the domed end up; otherwise, the antenna would fail to collect and broadcast the GPS position data. The floating characteristics were estimated based on the location of the center of gravity and center of buoyancy (CB) for the ablated design. Diagrams (a)-(c) in FIG. 4 show the waterline and relative locations of the CB and center of gravity (CG) when the data recovery device is displaced at different angles from its nominal attitude. It should be noted that the data recovery device's antenna plane is essentially level with the water's surface when the data recovery device is stable in flat water. For stability, when the attitude is moved away from the nominal attitude, the buoyancy force centered at the CB, which moves as the attitude changes, creates a moment around the CG tending to return the body to the nominal attitude.

Figure 5:
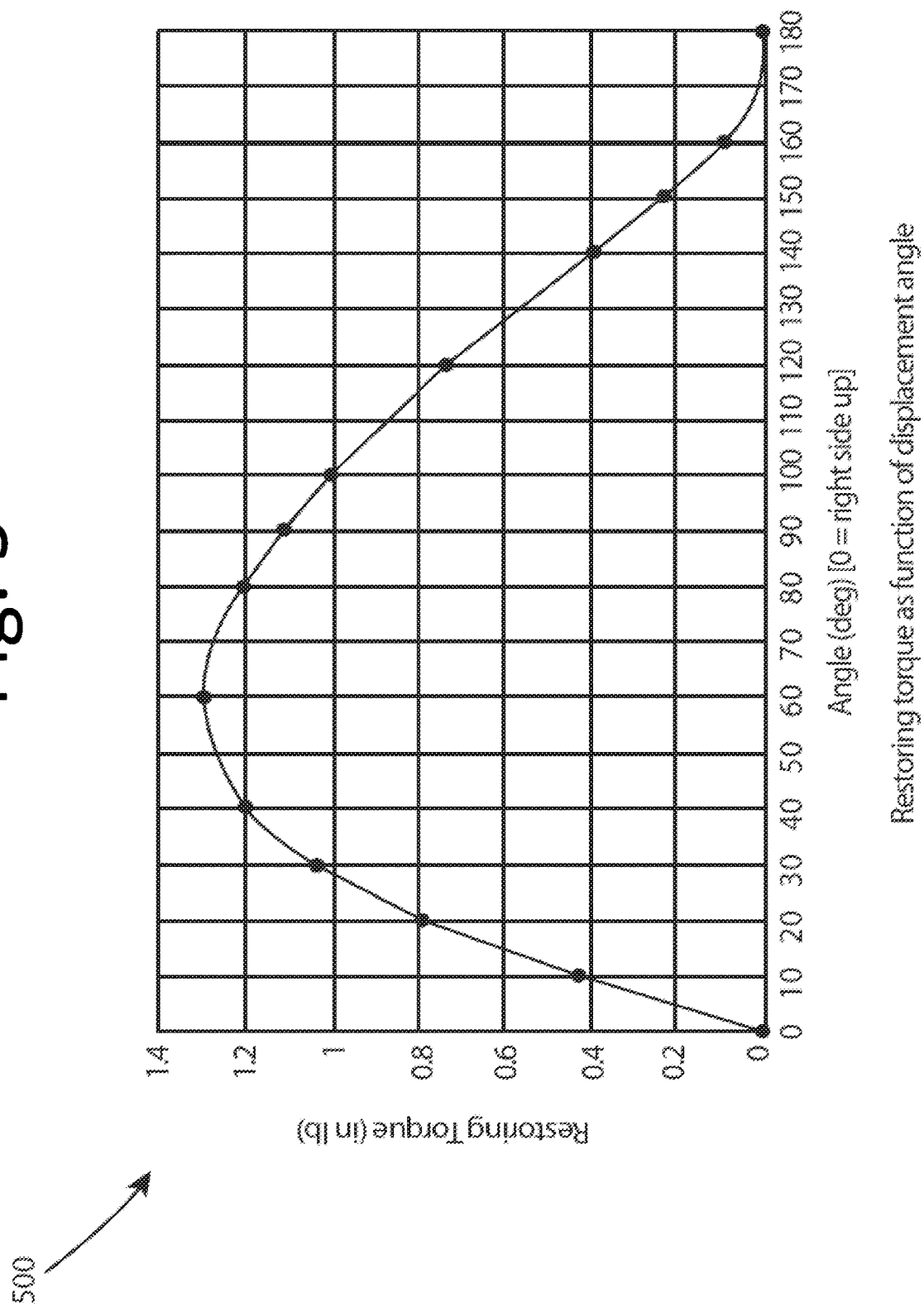
FIG. 5 is a graph illustrating restoring torque as a function of displacement angle, according to an embodiment of the present invention.

FIG. 5 is a graph 500 illustrating restoring torque as a function of displacement angle, according to an embodiment of the present invention. In graph 500, the variation of the buoyancy restoring moment as a function of the angle of displacement is shown. As is evident, the data recovery device is stable with the nose down except for a small range of angles when the dome is down. It is anticipated that data recovery device would be displaced from a dome-down attitude by the dynamics of an ocean environment and would not remain at this attitude for an extended period.

Figure 6:
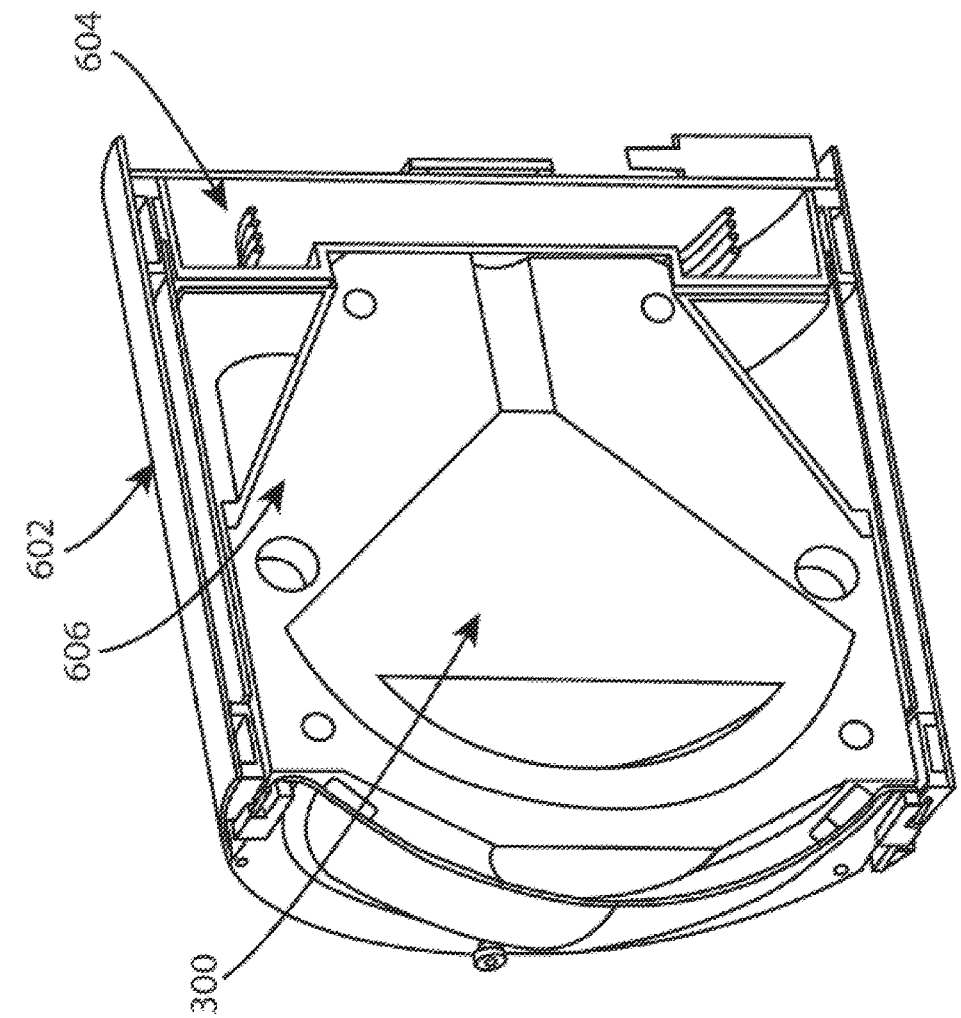
FIG. 6 is a diagram illustrating a deployment system for the data recovery device, according to an embodiment of the present invention.

FIG. 6 is a diagram illustrating a deployment system 600 for data recovery device 300, according to an embodiment of the present invention. During flight of the hypersonic vehicle, data recovery device 300 is placed in or enclosed in a container 602. Although not explicitly shown in FIG. 6, container 602 may include components and electronics required to connect to the hypersonic vehicle, to pre-process data received from the hypersonic vehicle, and to relay data and power from the hypersonic vehicle to the solid-state memory device 310. In some embodiments, container 602, which is customized for data recovery device 300, includes a hard, protective Sabot 606 surrounding data recovery device 300. The two halves of Sabot 606 are designed to separate from data recovery device 300 immediately after ejection from the deployment system 600. In some embodiments, the protective shell may be held together with bolts made of a low melting point material that will delay release of data recovery device 300. Container 602 also includes an ejection mechanism configured to eject or release data recovery device 300 from container 602. For example, in this embodiment, container 602 includes at least one spring 604, which ejects or releases data recovery device 300 from container 602 (and the hypersonic vehicle) during a breakup event or a command for release. It should be noted that for a controlled release, deployment system 600 is rear-facing (e.g., the domed end would face aft).

FIG. 7 is a flow diagram 700 illustrating deployment of data recovery device 300 from container 602, according to an embodiment of the present invention. In some embodiments, the pre-loaded spring, as shown in FIG. 6, are configured to force data recovery device 300 and its sabot 606 out the domed end of container 602. Rather than a pre-load spring, another embodiment may include a bottle configured to release a pressurized gas. In yet another embodiment, a pyrotechnic device may be used. The pyrotechnic device may activate and create the force required to push device 300 away from container 602. Sabot 606 may separate from data recovery device 300 during the release process. It should be noted that for purposes of explanation, only half of sabot 606 is shown.

Though not shown in FIG. 7, container 602 may include connections to the telemetry system of the hypersonic vehicle designed to transfer data and power to the data recovery device. The connection may be via universal serial bus or similar connector(s). Container 602 may sever the connection to the hypersonic vehicle when the ejection command is issued.

One or more embodiments generally pertain to a data recovery system comprising a container within a hypersonic vehicle. The container may house a data recovery device during hypersonic flight, and may include an ejection mechanism configured to eject the data recovery device from the container upon a breakup event or a command for release. Upon ejection from the container, the data recovery device is configured to receive GPS position data and configured to broadcast the GPS position data in short bursts during decent to a surface of the Earth and upon impact with the surface of the Earth to aid in recovery of the data recovery device.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a data recovery device configured to store data onboard a hypersonic vehicle travelling at hypersonic speeds; and
a thermal protection system integrated with a design of the data recovery device preventing temperature from exceeding a specified value in a hypersonic environment, the specified value being set by temperature limits of electronics and power systems contained within the data recovery device, wherein
the data recovery device is released from the hypersonic vehicle upon a release command or an anomalous event,
upon release, the data recovery device is configured to receive Global Positioning System (GPS) position data and configured to broadcast the GPS position data in short bursts during descent to a surface of the Earth and upon impact with the surface of the Earth to aid in recovery of the data recovery device, and
the data recovery device is self-contained passively withstanding severe hypersonic heating and loads through use of the thermal protection system, passively maintaining aerodynamic stability during hypersonic flight through a configuration of a center of mass and an aerodynamic shape, passively floating in an upright position upon impact with the surface of the Earth through the configuration of the center of mass and the aerodynamic shape.

2. The apparatus of claim 1, wherein the data recovery device comprises a solid-state memory device housed within a payload of the data recovery device, the solid-state memory device is configured to store data comprising sensor information while onboard the hypersonic vehicle.

3. The apparatus of claim 1, wherein the data recovery device further comprises a GPS receiver housed within a payload of the data recovery device, the GPS receiver is configured to receive GPS position data, both during descent to the Earth's surface and upon impact with the Earth's surface.

4. The apparatus of claim 1, wherein the data recovery device further comprises an antenna housed within a payload of the data recovery device, the antenna is configured to broadcast short bursts of GPS position data to aid in recovery of the data recovery device.

5. The apparatus of claim 1, wherein the center of mass and aerodynamic shape are configured to cause an antenna of the data recovery device to face towards zenith of the Earth's atmosphere during subsonic flight, and upon impact with the Earth's surface and while floating.

6. The apparatus of claim 5, wherein the center of mass and aerodynamic shape are further configured to force an antenna housed within a payload of the data recovery device to face towards the zenith to allow the antenna to broadcast in short bursts.

7. The apparatus of claim 1, wherein the data recovery device is configured to receive power from the hypersonic vehicle via a universal serial bus connection, conserving power onboard the data recovery device.

8. The apparatus of claim 7, wherein the data recovery device further comprises a power supply housed within a payload of the data recovery device, the power supply is activated upon release of the data recovery device from the hypersonic vehicle and configured to supply limited power to GPS receiver, Iridium modem, and antenna in order to aid in recovery of the data recovery device.

9. The apparatus of claim 1, wherein the data recovery device further comprises a thermal protection system (TPS) surrounding a payload of the data recovery device and the configuration of the center of mass and aerodynamic shape to protect the data recovery device from severe aerodynamic heating during the hypersonic portion of its descent to the Earth's surface.

10. The apparatus of claim 1, wherein the data recovery device is housed within a container configured to protect the data recovery device onboard the hypersonic vehicle.

11. The apparatus of claim 2, wherein the container comprises a protective shell surrounding the data recovery device and one or more springs configured to separate the data recovery device from the container during release from the hypersonic vehicle.

12. A data recovery system, comprising:
a container within a hypersonic vehicle configured to house a data recovery device during hypersonic flight; and
a thermal protection system integrated with a design of the data recovery device preventing temperature from exceeding a specified value in a hypersonic environment, the specified value being set by temperature limits of electronics and power systems contained within the data recovery device, wherein
the container comprises an ejection mechanism configured to eject the data recovery device from the container upon a breakup event or a command for release,
upon ejection from the container, the data recovery device is configured to receive Global Positioning System (GPS) position data and configured to broadcast the GPS position data in short bursts during descent to a surface of the Earth and upon impact with the surface of the Earth to aid in recovery of the data recovery device, and
the data recovery device utilizes configuration of a center of mass and aerodynamic shape assuring that the data recovery device maintains stability during hypersonic flight and causes the data recovery device to maintain an upright position upon impact with the surface of Earth and while floating.

13. The data recovery system of claim 12, wherein the data recovery device comprises a solid-state memory device housed within a payload of the data recovery device, the solid-state memory device is configured to store data comprising sensor information while onboard the hypersonic vehicle.

14. The data recovery system of claim 12, wherein the data recovery device further comprises a GPS receiver housed within a payload of the data recovery device, the GPS receiver is configured to receive GPS position data, both during descent to the Earth's surface and upon impact with the Earth's surface.

15. The data recovery system of claim 12, wherein the data recovery device further comprises an antenna housed within a payload of the data recovery device, the antenna is configured to broadcast short bursts of GPS position data to aid in recovery of the data recovery device.

16. The data recovery system of claim 12, wherein the center of mass and aerodynamic shape are configured to cause the antenna of the data recovery device to face towards zenith of the Earth's atmosphere prior to and upon impact with the Earth's surface.

17. The data recovery system of claim 16, wherein the center of mass and aerodynamic shape are further configured to force an antenna housed within a payload of the data recovery device to face towards the zenith to allow the antenna to broadcast in short bursts.

18. The data recovery system of claim 12, wherein the data recovery device further comprises a power supply housed within a payload of the data recovery device, the power supply is activated upon release of the data recovery device from the hypersonic vehicle and configured to supply limited power to GPS receiver, Iridium modem, and antenna in order to aid in recovery of the data recovery device.

19. The data recovery system of claim 12, wherein the data recovery device further comprises a thermal protection system (TPS) surrounding a payload of the data recovery device to protect the data recovery device from severe aerodynamic heating during the hypersonic portion of its descent to the Earth's surface.

20. A data recovery device, comprising:
   a thermal protection system integrated with a design of the data recovery device preventing temperature from exceeding a specified value in a hypersonic environment, the specified value being set by temperature limits of electronics and power systems contained within the data recovery device;
   a modem comprising a Global Positioning System (GPS) receiver and Iridium modem configured to receive GPS position data upon ejection from the hypersonic vehicle;
   an antenna ground plane comprising an Iridium antenna and a GPS antenna configured to broadcast the GPS position data upon ejection of the data recovery device from the hypersonic vehicle; and
   a configuration of a center of mass and an aerodynamic shape configured to assure the data recovery device maintains stability during hypersonic flight and causes the data recovery device to maintain an upright position upon impact with the surface of Earth and while floating.

21. The apparatus of claim 1, wherein the data recovery device further comprises a transmitter housed within a payload of the data recovery device, the transmitter is configured to broadcast short bursts of GPS position data to aid in recovery of the data recovery device.

22. The apparatus of claim 1, wherein the center of mass and aerodynamic shape are configured to cause the nose of the data recovery device to face forward during hypersonic, supersonic, and subsonic flight of the data recovery device.

23. The apparatus of claim 1, wherein the data recovery device is configured to float after impact in water.

24. The data recovery system of claim 12, wherein the data recovery device further comprises a transmitter housed within a payload of the data recovery device, the transmitter is configured to broadcast short bursts of GPS position data to aid in recovery of the data recovery device without deployment of antenna or jettison of protective covers.

* * * * *